United States Patent
Chang et al.

(10) Patent No.: US 10,623,460 B2
(45) Date of Patent: Apr. 14, 2020

(54) STREAMING APPLICATION ENVIRONMENT WITH REMOTE DEVICE INPUT SYNCHRONIZATION

(71) Applicant: GOOGLE INC., Mountain View, CA (US)

(72) Inventors: Chuo-Ling Chang, Mountain View, CA (US); Ping-Hao Wu, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 222 days.

(21) Appl. No.: 15/368,535

(22) Filed: Dec. 2, 2016

(65) Prior Publication Data
US 2018/0146018 A1 May 24, 2018

Related U.S. Application Data

(60) Provisional application No. 62/424,167, filed on Nov. 18, 2016.

(51) Int. Cl.
| | | |
|---|---|---|
| *H04N 21/462* | (2011.01) | |
| *H04N 21/442* | (2011.01) | |
| *H04N 21/44* | (2011.01) | |
| *G06F 3/0484* | (2013.01) | |
| *H04N 21/438* | (2011.01) | |

(Continued)

(52) U.S. Cl.
CPC ............ *H04L 65/601* (2013.01); *G06F 9/452* (2018.02); *H04L 43/087* (2013.01); *H04N 21/41407* (2013.01); *H04N 21/6125* (2013.01); *H04N 21/6175* (2013.01); *H04N 21/6377* (2013.01); *H04N 21/8173* (2013.01)

(58) Field of Classification Search
CPC ..... H04L 65/601; H04L 43/087; G06F 9/452; H04N 21/41407; H04N 21/6125
USPC .......................................................... 709/219
See application file for complete search history.

(56) References Cited

U.S. PATENT DOCUMENTS

| | | | | |
|---|---|---|---|---|
| 6,725,287 | B1 * | 4/2004 | Loeb | G06N 5/025 710/8 |
| 8,752,085 | B1 * | 6/2014 | Brueck | H04L 65/601 725/32 |

(Continued)

FOREIGN PATENT DOCUMENTS

KR 1020120093154 8/2012

OTHER PUBLICATIONS

International Search Report and Written Opinion of PCT Ser. No. PCT/US2017/052598; 13 pages dated Nov. 14, 2017.

(Continued)

*Primary Examiner* — Kevin T Bates
*Assistant Examiner* — Golam Mahmud
(74) *Attorney, Agent, or Firm* — Middleton Reutlinger

(57) ABSTRACT

In a streaming application environment, input generated in a remote device may be synchronized with rendered content generated by a virtual streaming application in the streaming application environment in part by using frame refresh events passed between the remote device and the streaming application environment to enable the streaming application environment to effectively track a frame refresh rate of the remote device such that input events received from the remote device may be injected into the virtual streaming application at appropriate frame intervals.

18 Claims, 6 Drawing Sheets

(51) Int. Cl.
*H04L 29/06* (2006.01)
*H04N 21/61* (2011.01)
*G06F 9/451* (2018.01)
*H04N 21/81* (2011.01)
*H04N 21/6377* (2011.01)
*H04N 21/414* (2011.01)
*H04L 12/26* (2006.01)

(56) References Cited

U.S. PATENT DOCUMENTS

| | | | | |
|---|---|---|---|---|
| 8,806,054 | B1* | 8/2014 | Overton | G06F 3/04812 709/232 |
| 8,862,695 | B2 | 10/2014 | Spracklen | H04L 43/0829 709/217 |
| 8,874,058 | B2* | 10/2014 | Hashimoto | H04N 7/24 370/248 |
| 9,549,152 | B1* | 1/2017 | Nayyar | H04N 7/148 |
| 2004/0194130 | A1* | 9/2004 | Konig | G06Q 30/02 725/32 |
| 2007/0255763 | A1* | 11/2007 | Beyerle | G06F 16/275 |
| 2008/0134276 | A1* | 6/2008 | Orrell | H04H 20/426 725/132 |
| 2008/0282031 | A1* | 11/2008 | Tanoue | G06F 3/0611 711/114 |
| 2010/0128169 | A1* | 5/2010 | Yi | H04N 7/0125 348/441 |
| 2010/0295803 | A1* | 11/2010 | Kim | G06F 3/0488 345/173 |
| 2011/0092221 | A1* | 4/2011 | Zubas | H04M 1/72547 455/456.1 |
| 2012/0189322 | A1 | 7/2012 | Mo et al. | |
| 2012/0266068 | A1 | 10/2012 | Ryman et al. | |
| 2013/0159565 | A1* | 6/2013 | Soyannwo | G06F 9/452 710/33 |
| 2014/0025795 | A1* | 1/2014 | Fiennnes | H04N 21/4126 709/222 |
| 2014/0090007 | A1* | 3/2014 | Okubo | H04N 21/4302 725/153 |
| 2014/0204036 | A1* | 7/2014 | Schillings | G06F 3/04883 345/173 |
| 2014/0223490 | A1* | 8/2014 | Pan | H04N 21/42224 725/61 |
| 2014/0226901 | A1 | 8/2014 | Spracklen et al. | |
| 2014/0307168 | A1 | 10/2014 | Law et al. | |
| 2014/0364204 | A1 | 12/2014 | Tornqvist | |
| 2014/0372506 | A1* | 12/2014 | Butner | H04L 67/04 709/203 |
| 2015/0003296 | A1* | 1/2015 | Fan | H04L 41/0806 370/255 |
| 2015/0084908 | A1 | 3/2015 | Jordan | |
| 2015/0149957 | A1 | 5/2015 | Enomoto | |
| 2015/0346855 | A1* | 12/2015 | Momchilov | G06F 3/038 345/173 |
| 2016/0127508 | A1* | 5/2016 | Perrin | G06T 1/20 709/219 |
| 2016/0142769 | A1* | 5/2016 | Spracklen | G06F 9/451 725/132 |
| 2016/0182924 | A1* | 6/2016 | Todd | H04N 21/2343 725/116 |
| 2016/0253779 | A1* | 9/2016 | Park | G06T 3/4007 382/264 |
| 2016/0357429 | A1* | 12/2016 | Nilo | G06F 3/0416 |
| 2017/0032015 | A1* | 2/2017 | Shkapenyuk | G06F 16/285 |
| 2018/0007311 | A1* | 1/2018 | Kato | G09G 5/36 |
| 2018/0035136 | A1* | 2/2018 | Crowe | H04N 21/21805 |
| 2018/0062846 | A1* | 3/2018 | Li | G06F 21/32 |
| 2018/0109625 | A1* | 4/2018 | Jayaraman | H04L 67/141 |
| 2018/0329600 | A1 | 11/2018 | Shan | |
| 2018/0376177 | A1* | 12/2018 | Nugent | H04N 21/2381 |
| 2019/0121682 | A1* | 4/2019 | Adiletta | G06F 13/12 |

OTHER PUBLICATIONS

European Patent Office; Written Opinion of the International Preliminary Examining Authority of PCT Ser. No. PCT/US2017/052598; 4 pages; dated Oct. 2, 2018.

Huang et al., "Gaming Anywhere: An Open Cloud Gaming System". DOI: 10.1145/2483977.2483981; ISBN: 978-1-4503-1894-5. 12 pages Feb 2013.

Hsu et al., "Toward an Adaptive Screenshot Platform: Measurement and Optimization"; ACM Transactions on Multimedia Computing Communications and Applications, vol. 12, No. 5s, Article 79. 24 pages Nov. 2016.

Wu et al., "Enabling Adaptive High-Frame-Rate Video Streaming in Mobile Cloud Gaming Applications". IEEE Transactions on Circuits and Systems for Video Technology, IEEE, USA; vol. 25, No. 12. 14 pages Dec. 2015.

Shi et al., "A Survey of Interactive Remote Rendering Systems". ACM Computing Surveys, ACM, New York, NY, vol. 47, No. 4. 30 pages May 2015.

European Patent Office; Written Opinion of the International Preliminary Report on Patentability of PCT Ser. No. PCT/US2017/052598; 23 pages; dated Mar. 27, 2019.

The European Patent Office; Intention to Grant issued in Application No. 17780270.9 dated Sep. 27, 2019.

The Korean Intellectual Property Office; Office Action issued in Application No. 10-2019-7017486 dated Aug. 13, 2019.

The Korean Intellectual Property Office, Notice of Allowance issued in Application No. 10-2019-7017486, dated Nov. 9, 2019.

* cited by examiner

STREAMING APPLICATION ENVIRONMENT WITH REMOTE DEVICE INPUT SYNCHRONIZATION

BACKGROUND

Some application services provide the ability to interactively "stream" software applications (more simply "applications" or "apps") to remote devices, e.g., mobile devices such as smart phones, tablet computers, vehicle computing systems, wearable devices (e.g., smart watches), etc. Streaming of such applications may allow a user to operate the applications without actually downloading and installing the applications locally on the remote device, which may be useful in remote devices having limited processing and/or memory resources, or for the purposes of trying out applications. In some instances, application streaming may be accomplished by installing an application on a virtual machine operated by one or more servers (e.g., collectively forming a so-called "cloud"), whereby one or more input/output ("I/O") streams may be established between the virtual machine and the remote device to provide various modalities of input data received at the remote device to the virtual machine, and likewise to provide various modalities of output data generated by the application from the virtual machine to the remote device.

In some instances, the application services are implemented in a streaming application environment capable of supporting one or more virtual streaming applications for use by one or more remote devices. Further, in some instances, virtual streaming application-generated content may be output in the form of rendering framebuffers that are captured, encoded and streamed to a remote device for video playback. Then, on the remote device, user-control information such as gesture or touch events and other inputs may be captured, encoded and uploaded to the streaming application environment and injected into a virtual streaming application to render its content accordingly.

Synchronizing the injection of user-control information and other inputs with the rendering of application content on a remote device, however, can be problematic even beyond the synchronization challenges presented by local applications on a remote device. For example, where a computing device such as a mobile device includes a touchscreen capable of being manipulated by a user's fingers, ensuring that user input such as a finger swipe or a scrolling gesture is tracked by rendered content can be challenging even for a locally-installed application.

As an example, many gestures directed to a touchscreen are handled using multiple events. In many instances, a gesture such as a finger swipe is generally represented by a "touch down" event that is signaled when the user first places a finger on the touchscreen, a "touch up" event that is signaled when the user lifts the finger off the touchscreen, and numerous "touch move" events that track the movement of the finger while touching the touchscreen. In many computing devices, events may be generated on a touchscreen computing device at a rate that matches a frame refresh rate for the device, i.e., the rate at which rendered content in the form of frames is updated on a touchscreen. Further, in many computing devices, frames may be updated at about 60 Hz or more, and as such, a simple finger swipe may result in the generation of tens or hundreds of individual but related events. Moreover, it has been found that when some types of user input events are not appropriately synchronized with the rendered content frames during which the input events are generated, a poor user experience may result. As but one example, slowly scrolling through content by dragging a user's finger across a touchscreen can result in jerkiness when events associated with the movement are mapped to the wrong frames.

Where a computing device is interacting with a virtual streaming application in a streaming application environment over a packet-switched network such as the Internet, however, the aforementioned synchronization challenge is far greater. Due to the practical limitations of the Internet and other packet-switched networks, packets containing user input and/or rendered content may be delayed or lost entirely, and may arrive out of order. Furthermore, where network connectivity is compromised as may be the case in many mobile and/or vehicle applications, the risk of packet loss or delay is greater. While protocols such as Transmission Control Protocol (TCP) allow for packet retransmission in the event of lost packets, waiting for all packets to be received in order to ensure that all input data and rendered content is received and processed may introduce unacceptable delays and detract from the user experience.

SUMMARY

Some implementations disclosed herein may include a method performed in a streaming application environment including one or more processors, which may include interfacing a virtual streaming application with a remote device coupled to the streaming application environment over a packet-switched network, including receiving from the packet-switched network input generated at the remote device and streaming an output display representation generated by the virtual streaming application in response to the received input over the packet-switched network to the remote device, receiving frame refresh events from the remote device, each frame refresh event associated with a frame on the remote device, receiving input events from the remote device, each input event associated with an input generated during a frame on the remote device, generating virtual frames for the virtual streaming application corresponding to the frames with which the received frame refresh events are associated, and controlling injection of the received input events into the virtual streaming application to arrange the received input events within the virtual frames corresponding to the frames with which the received input events are associated.

In some implementations, the packet-switched network includes the Internet, and the remote device includes a mobile phone, a tablet computer, a wearable computer, or a vehicle computer. Also, in some implementations, the frame refresh events from the remote device are generated based upon a frame refresh rate of the remote device, and generating the virtual frames includes controlling a virtual frame refresh rate to track the frame refresh rate of the remote device.

Further, in some implementations, generating virtual frames for the virtual streaming application includes generating a first virtual frame refresh event in response to a first frame refresh event received from the remote device. In addition, in some implementations, generating the first virtual frame refresh event includes controlling a delay between issuing the first virtual frame refresh event to the virtual streaming application and receipt of the first frame refresh event from the remote device. Further, in some implementations, controlling the delay includes scheduling issuance of the first virtual frame refresh event according to $V(t)=A(t')+(t-t')+D$, where t is a timestamp included with the first frame refresh event received from the remote device, t' is a relative minimum one-way network delay, V(t) is an issue time in the streaming application environment at which to issue the first virtual frame refresh event, A(t') is a receipt time in the streaming application environment at which the first frame refresh event is received from the remote device, and D is a maximum playback delay.

In some implementations, controlling the delay includes varying the delay based upon observed network jitter in the packet-switched network. In addition, in some implementations, generating virtual frames for the virtual streaming application includes scheduling issue of a next virtual frame refresh event in response to issuing the first virtual frame refresh event and based upon extrapolation from prior frame refresh events received from the remote device such that the next virtual frame refresh event is issued despite delay or loss of a next frame refresh event from the remote device. Further, in some implementations, generating virtual frames for the virtual streaming application includes scheduling issue of a next virtual frame refresh event in response to issuing the first virtual frame refresh event and based upon interpolation between the first frame refresh event and a later frame refresh event received from the remote device such that the next virtual frame refresh event is issued despite delay or loss of a next frame refresh event from the remote device.

In some implementations, the streaming application environment further includes a video streaming component configured to stream the output display representation generated by the virtual streaming application, and the method further includes scheduling issuance of a first streaming component frame refresh event to the video streaming component with a controlled delay relative to the first virtual frame refresh event. Further, in some implementations, controlling injection of the received input events into the virtual streaming application includes queuing the received input events, including queuing an associated timestamp for each received input event, and during a first virtual frame corresponding to a first frame on the remote device, ignoring any queued input event that is a duplicate, injecting any queued input event that is on schedule, discarding any queued input event that is late arriving, and continuing to queue any queued input event that is early arriving. In addition, in some implementations, each input event is associated with user input directed to a touchscreen of the remote device.

Some implementations may also include a method performed in a device including one or more processors and a display, which may include receiving an output display representation from a streaming application environment coupled to the device over a packet-switched network, the output display representation generated by a virtual streaming application resident in the streaming application environment, rendering a plurality of frames of the received output display representation on the display, in response to inputs generated during rendering of the plurality of frames, issuing input events for communication over the packet-switched network to the streaming application environment, each input event associated with a frame among the plurality of frames during which the an associated input is generated, and issuing frame refresh events for each of the plurality of frames for communication over the packet-switched network to the streaming application environment to enable the streaming application environment to control injection of the input events to arrange the input events within virtual frames of the virtual streaming application corresponding to the frames associated with the input events.

Some implementations also include a system including one or more processors and memory operably coupled with the one or more processors, where the memory stores instructions that, in response to execution of the instructions by the one or more processors, cause the one or more processors to perform any of the above methods. Some implementations may also include at least one non-transitory computer-readable medium including instructions that, in response to execution of the instructions by one or more processors, cause the one or more processors to perform any of the above methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Application streaming allows users in some instances to run applications on a computing device such as a mobile phone without having to download and install the applications on the computing device itself. In some instances, for example, a streaming application environment, e.g., as may be implemented on one or more servers in a cloud computing system that is accessible to a computing device over a network such as the Internet. Applications may be run as virtual streaming applications within the streaming application environment, e.g., by running the applications in virtual machines or in some instances as virtual computing devices that effectively emulate physical computing devices and/or the operating systems of such devices. In addition, a streaming application environment may include functionality to interface virtual streaming applications with a computing device, including an ability to receive input generated at the computing device to control the virtual streaming application as well as an ability to stream an output display representation of rendered content generated by the virtual streaming application.

Figure 1:
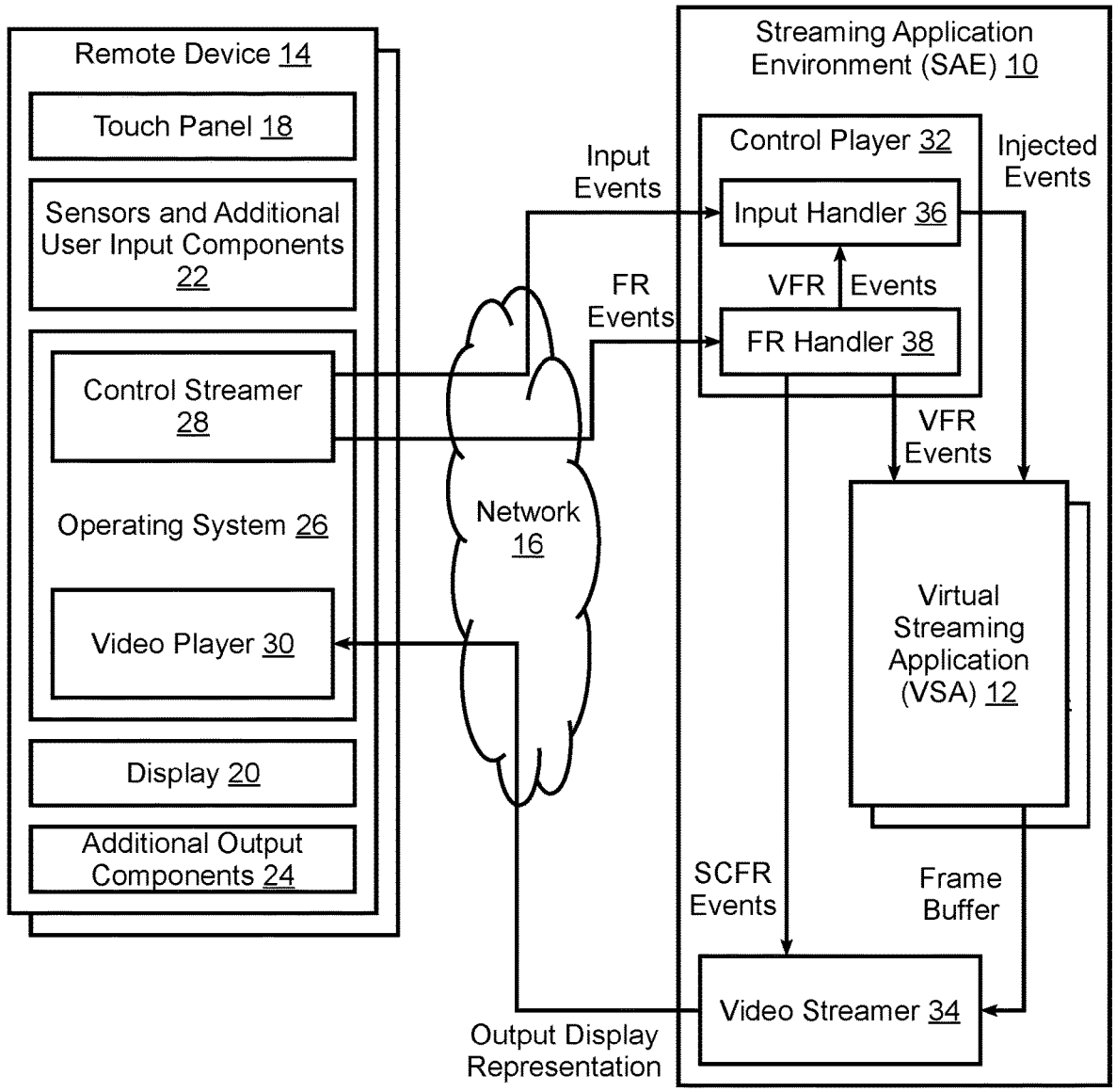
FIG. 1 illustrates an example environment in which disclosed techniques may be practiced, in accordance with various implementations.

FIG. 1, for example, illustrates an example streaming application environment (SAE) 10 capable of hosting and interfacing one or more virtual streaming applications (VSAs) 12 with one or more remote devices 14 over one or more networks 16. As noted above, streaming application environment 10 may be implemented, for example, as a service of a cloud computing system, and thus implemented using one or more hardware servers of a cloud computing system. Device(s) 14, which are remote from the standpoint that they are coupled to but distinct from streaming application environment 10, may be implemented using practically any type of computing device capable of accessing a cloud computing system, although the discussion hereinafter primarily focuses on mobile devices such as mobile phones, tablet computers, vehicle computers, wearable computers, etc. Communication between devices 14 and streaming application environment 10, as noted above, may be conducted over one or more networks 16, which in some implementations includes at least one packet-switched network such as a local area network (LAN), wide area network (WAN), the Internet, etc., such that communications between devices 14 and application streaming environment 10 utilize packets to communicate data therebetween.

Consistent with remote devices being mobile devices in some implementations, FIG. 1 illustrates an example remote device 14 including a touch panel 18 capable of receiving touch inputs from a user and a display 20 capable of outputting video or graphical content to a user, which in some implementations may be combined into a single touch-sensitive screen, or touchscreen. Device 14 may also include additional sensors and user input components 22 and/or additional output components 24, generally depending upon the application of the device. Various sensors and components that may be used in different implementations include accelerometers, GPS sensors, gyroscopes, hard buttons, keyboards, pointing devices, microphones, imaging devices, speakers, indicators, and haptic feedback devices, among others.

Other variations and modifications to the environment illustrated in FIG. 1 will be appreciated, and as such, the invention is not limited to the particular environment disclosed herein.

The implementations discussed hereinafter address, in part, the synchronization of inputs with rendered visual content in a streaming application environment. For the purpose of simplifying the discussion, the hereinafter-described implementations will focus in particular on the synchronization of user gestures with rendered visual content, and in particular user input directed to a touchscreen. It will be appreciated, however, that the principles disclosed herein may be applied to other types of inputs, including other user inputs such as user manipulation of a mouse, trackball or other pointing device, user gestures captured by an imaging device or a handheld or wearable motion sensor, as well as additional inputs such as sensor inputs. Thus, the invention is also not limited to the particular inputs disclosed by way of example herein.

A common user interaction with a touchscreen device is a single or multi-finger gesture to scroll and/or zoom displayed content. On a physical touchscreen device, touchscreen hardware may trigger a continuous stream of touch events that describe the locations of the user's fingers as they move across the touchscreen. These events are generally processed and interpreted by the device to make corresponding modifications to the displayed content on the device. Swiping a finger up or down in a region of a display dedicated to scrollable content may therefore lead to a corresponding scrolling of the content to follow the motion of the finger. A seamless user experience occurs when the movement of the content precisely follows the motion of the finger, and it has been found that driving the rate (frequency) of the touch events and the rendering framerate by the same clock on a physical device obtains acceptable results. Consequently, with a nominal clock rate of 60 Hz, finger movements across short intervals of $\frac{1}{60}$ seconds generally are mapped to consecutive frames rendered at 60 fps. Undesirable results, however, can occur when the one-on-one alignment between a $\frac{1}{60}$-second movement to a rendered frame is lost, such that if two $\frac{1}{60}$-second movements are mapped to a single frame while the next frame does not see any movement, jerky scrolling can occur.

With application streaming, on the other hand, the interaction between touch events and frame rendering works similarly, except that there are multiple components and a network between a device that generates input and displays rendered content, and a virtual streaming application that processes that input to generate the rendered content displayed on the device.

In an idealistic situation where (1) the network has no packet loss and no delay jitter, i.e., the network round-trip-time (RTT) is constant, and (2) rendering framerate in the virtual streaming application, the encoding framerate in the streaming application environment, and the frame refresh rate in the remote device are the same, e.g. all at exactly 60 Hz, scrolling via application streaming would be as smooth as scrolling in a local application on a physical device other than having an extra delay introduced by the network RTT and the processing time in the additional components. However, in reality some touch events can get lost in the network, and because of network jitter each touch event can take a different amount of time to travel from the remote device to the streaming application environment, and can even arrive out of order. In addition, some remote devices do not always use the same, consistent frame refresh rate (e.g., varying slightly from 60 Hz, and in some instances reducing to a lower frame refresh rate when entering power-saving mode), and components in an streaming application environment may include delays that cause variations in the frame refresh rate used for a virtual streaming application. As such, there is generally an increased risk that multiple touch events can be mapped into a single frame, while no events may be mapped into adjacent frames, leading to jerky movement.

In some implementations, therefore, a number of modules or components may be implemented within a remote device 14 and a streaming application environment 10 to assist with synchronization of input with rendered content with application streaming. In particular, in some implementations an operating system 26 of a remote device 14 may include a control streamer component 28 and a video player component 30 that are respectively in communication with a control player component 32 and a video streaming component, or video streamer, 34 implemented within streaming application environment 10.

Control streamer component 28 is used to stream both input events and frame refresh (FR) events to control player component 32, the former of which are streamed to an input handler component 36 in control player component 32 and the latter of which are streamed to a frame refresh (FR) handler component 38 in control player component 32. Input events are events generated by remote device 14 to control virtual streaming application 12, and may include, for example, gesture events such as touch events, although it will be appreciated that events generated in remote device 14 in response to other inputs, e.g., other user input and/or sensor data, may also be supplied to virtual streaming application 12 in the form of input events. FR events are events generated in response to frame refreshes in remote device 14, e.g., similar to vsync events generated in some physical computing devices in connection with rendering frames on such devices.

Input handler component 36, as will become more apparent below, injects, or "plays back," input events received by control player component 32 into virtual streaming application 12. FR handler component 38 generates refresh events within streaming application environment 10 in response to FR events received by control player component 32, including virtual frame refresh (VFR) events that are provided to virtual streaming application 12 and to input handler component 36 to synchronize input events with their corresponding frames on the remote device, as well as streaming component frame refresh (SCFR) events that are provided to video streaming component 34 to synchronize the encoding and streaming of rendered content output by virtual streaming application 12. Rendered content, in some implementations, is provided to video streaming component 34 in the form of virtual frames stored in a frame buffer populated by virtual streaming application 12, and as such, the VFR events generated by FR handler component 38 are associated with virtual frames of virtual streaming application 12 in a similar manner to the way in which FR events generated by remote device 14 are associated with rendered frames in remote device 14.

Video streaming component 34 may process the virtual frames by encoding the virtual frames and communicating the encoded virtual frames to video player component 30 of remote device 14, which in turn decodes the encoded virtual frames and displays the rendered content on the display 20 of the remote device 14. The rendered content may be considered in some implementations to be an output display representation, i.e., data capable of being used to generate a visual depiction of the rendered content on a remote device. It will also be appreciated that the output display representation may be encoded, unencoded, encrypted, unencrypted, or otherwise defined using various formats, so the invention is not limited to any particular format of data so long as the data may be used to generate a visual depiction of rendered content on a display. In some implementations, for example, the output display representation may be implemented as an encoded digital video stream.

In some implementations, control streamer component 28 may implement listener and/or callback routines to handle system events in operating system 26. For example, some input events may be generated in response to events generated in response to various types of touch events detected by operating system 26. Likewise, in some implementations, FR events may be generated in response to invocation of a frame rendering routine that renders a new frame for display on remote device 14. FR events may be generated, for example, periodically at a vsync rate of the remote device, which may be around 60 Hz in some implementations, and both FR events and input events may include associated timestamps representing remote device system time when the corresponding system event occurred. Moreover, in some implementations, each frame rendering is configured to reflect the content updates triggered by the input events, if any, with timestamps that fall within the current frame or vsync interval, i.e., between the current FR event timestamp and the previous one. In some implementations, input and FR events may also be serialized and/or encrypted prior to communication over network 16.

Figure 2:
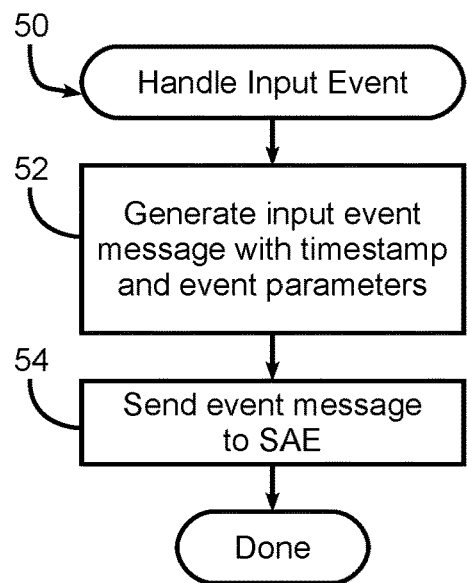
FIG. 2 is a flowchart illustrating an example sequence of operations for handling an input event in the example environment of FIG. 1.
Figure 3:
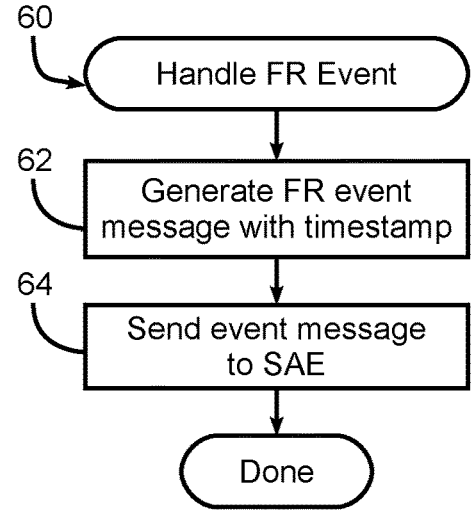
FIG. 3 is a flowchart illustrating an example sequence of operations for handling a frame refresh event in the example environment of FIG. 1.

FIGS. 2 and 3, for example, respectively illustrate sequences of operations that may be implemented in control streamer component 28 of remote device 14 to respectively generate input and frame refresh (FR) events for communication to streaming application environment 10. As shown in FIG. 2, a sequence of operations 50 may be used to handle input events generated within remote device 14, e.g., gesture or touch events. In block 52, an input event message is generated, including a remote device system time timestamp, as well as any related event parameters, e.g., touch coordinates, identifiers of related input events (e.g., for touch move or touch up events associated with a particular gesture, the timestamp of the initial touch down event that started the gesture), etc. Block 54 then sends the generated event message to the streaming application environment 10, and sequence of operations 50 is complete. Similarly, as illustrated by sequence of operations 60 in FIG. 3, for frame refresh events, an FR event message, generally including a remote device system time timestamp, may be generated in block 62, and then sent to the streaming application environment 10 in block 64. It will be appreciated that in both cases, the particular format of the messages and then manner in which the event data is encoded into packets may vary in different implementations based in part on the protocol used to communicate between remote device 14 and streaming application environment 10.

Remote Device Input Synchronization

As noted above, in some implementations streaming application environment 10 is configured to synchronize input from the remote device 14 with rendered content generated by a virtual streaming application 12. In particular, in some implementations the streaming application environment 10 may receive frame refresh events from a remote device 14 that are associated with particular frames on the remote device 14, receive input events from the remote device 14 that are associated with inputs generated during frames on the remote device 14, generate virtual frames for a virtual streaming application 12 corresponding to the frames with which the received frame refresh events are associated, and then control controlling injection of the received input events into the virtual streaming application 12 to arrange the received input events within the virtual frames corresponding to the frames with which the received input events are associated.

In some implementations, for example, a frame refresh (FR) handler component 38 of control player component 32 may effectively track a frame refresh rate of the remote device 14 based upon FR events communicated by control streamer component 28 of the remote device 14 and use the tracked frame refresh rate to drive the injection of input events into virtual streaming application 12, and in some instances, to drive the streaming of content from video streaming component 34. In some implementations, for example, the FR handler component 38 may generate VFR events at a virtual frame refresh rate that substantially tracks the frame refresh rate of the remote device. In addition, in some implementations, an input handler component 36 of control player component 32 may implement a queue that effectively operates as a jitter buffer to synchronize the injection of input events into the virtual streaming application 12.

To track the frame refresh rate, FR handler component 38 in some implementations may schedule VFR events in the following manner. For the purposes of this explanation, A(t) may be used to denote the streaming application environment system time when an FR event with a timestamp t is received by the streaming application environment 10. Issuance of a VFR event corresponding to the received FR event may then be scheduled for a streaming application environment system time denoted as V(t) using equation (1) below:

$$V(t)=A(t')+(t-t')+D \quad (1)$$

where D denotes a maximum playback delay (e.g., set to a value such as 20 ms in some implementation) and t' is a reference timestamp selected such that A(t')−t' is not greater than any other A(t)−t for all FR events received from the remote device to date. Put another way, t' may be considered to correspond to the FR event that travelled from the remote device to the streaming application environment 10 with the shortest transmission time, such that A(t')−t' is effectively the relative minimum one-way network delay, which is relative because the streaming application environment system clock used by A(t') and the remote device system clock used by t' are not, and generally do not need to be, synchronized. The selection of t' may be adjusted in some implementations, particularly at the beginning of a streaming session, but will generally settle to a final minimum value. With equation (1) defined above, the streaming application environment VFR event with timestamp t' may be dispatched at V(t')=A(t')+D, i.e., with an additional playback delay of D after the arrival of the corresponding FR event from the remote device. In addition, for all other VFR events, the playback delay will generally never be greater than D. Further, in some implementations, D may be automatically adjusted over time, e.g., based upon observed network jitter.

In addition, in some implementations, extrapolation and/or interpolation may be used in connection with tracking remote device FR events. In the illustration implementation, for example, each VFR event dispatch is initially scheduled in connection with the actual dispatch or issue of the prior VFR event. For example, right after dispatching a VFR event with timestamp $t_1$ at $V(t_1)=A(t')+(t_1-t')+D$, the VFR event with timestamp $t_2$ may be scheduled to dispatch soon at $V(t_2)=A(t')+(t_2-t')+D$.

However, if the FR event with timestamp $t_2$ is significantly delayed (or even lost) in the network, it is possible that this FR event still hasn't arrived at the streaming application environment by $V(t_1)$, and therefore scheduling of the next VFR event by FR handler component 38 may be complicated by the fact that the timestamp $t_2$ itself is still unknown. In some implementations, therefore, $t_2$ may be extrapolated from prior FR event timestamps, e.g., using equation (2):

$$t_2=t_1+(t_1-t_0) \quad (2)$$

Similarly, it is possible that the FR event with timestamp $t_2$ has not arrived at the streaming application environment but a later FR event with timestamp $t_0$ has arrived. In that case, therefore, some implementations may determine $V(t_2)$ using interpolation, e.g., using equation (3):

$$t_2=t_1+(t_n-t_1)/(n-1) \quad (3)$$

Through the use of extrapolation and/or interpolation, VFR events may be periodically issued at a rate substantially matching the FR event rate from the remote device 14, and generally even when some FR events are significantly delayed or lost. The VFR event schedule effectively may be recalibrated as soon as more FR events arrive in the environment.

As also noted above, FR handler component 38 may also drive video streaming component 34. In some implementations, however, rather than issuing the VFR events directly to video streaming component a controlled delay may be applied by scheduling a delayed version of a corresponding VFR event, referred to herein as a streaming component frame refresh (SCFR) event. In some implementations, for example, an SCFR event may be scheduled for issuance about 10 ms to accommodate the time the virtual streaming application takes to render a virtual frame, such that when the video streaming component 34 captures a virtual frame from the virtual streaming application framebuffer, the corresponding application content is fully rendered. It will also be appreciated, however, that if a virtual streaming application is configured to push a virtual frame to video streaming component 34 upon completion of rendering, no separate SCFR event may be used.

Figure 4:
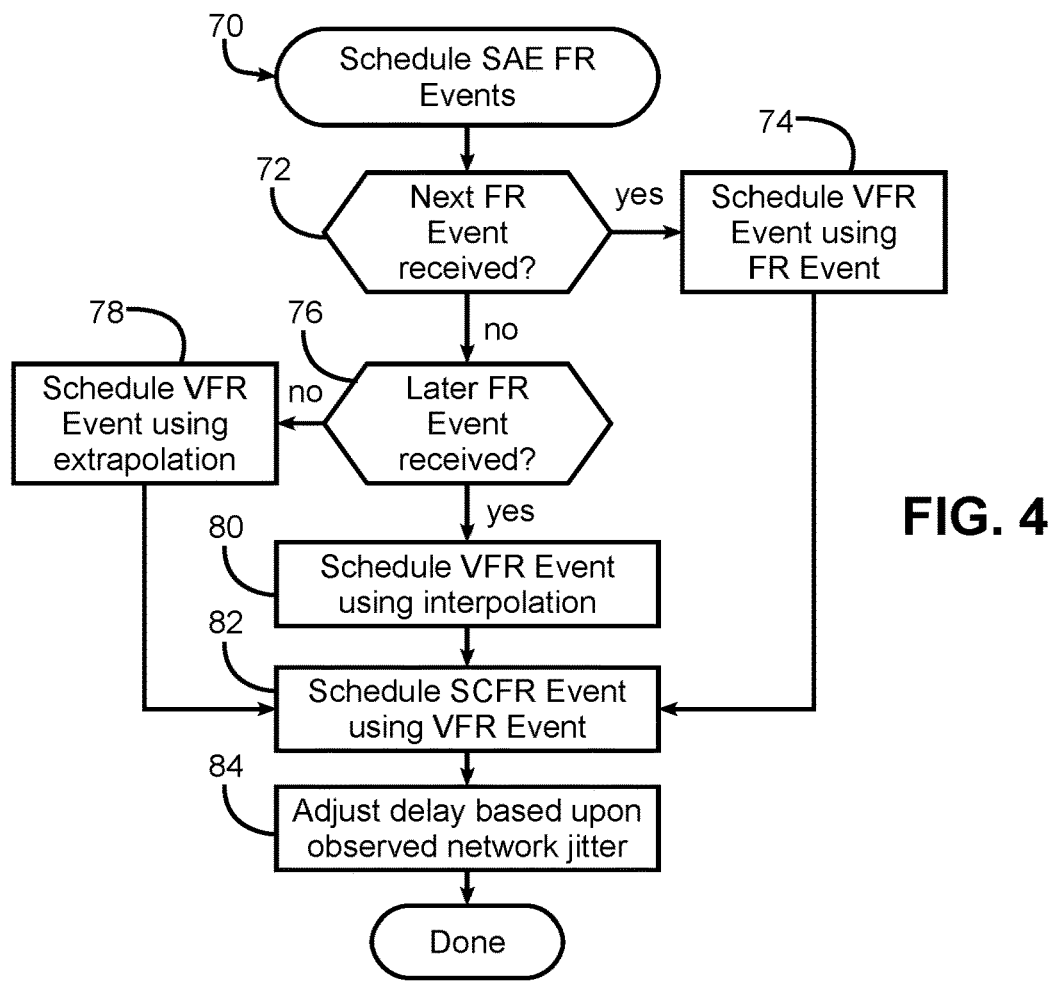
FIG. 4 is a flowchart illustrating an example sequence of operations for scheduling streaming application environment frame refresh events in the example environment of FIG. 1.

FIG. 4, for example, illustrates an example sequence of operations 70 executable by FR handler component 38 in some implementations for scheduling frame refresh events in streaming application environment 10. The sequence of operations may be called, for example, in response to issuance of a scheduled VFR event corresponding to a current FR event. Block 72 first determines if a next FR event has been received, and if so, passes control to block 74 to schedule the next VFR event using the timestamp of the received next FR event, e.g., using equation (1) above. If the next FR event is not received, however, block 72 passes control to block 76 to determine if a later FR event has been received. If not, control passes to block 78 to schedule the next VFR event using extrapolation, e.g., by extrapolating from the prior two FR event timestamps using equation (2) above. If, on the other hand, a later FR event has been received, block 76 passes control to block 80 to schedule the next VFR event using interpolation, e.g., using equation (3) above.

Once the next VFR event is scheduled by block 74, 78 or 80, control passes to block 82 to schedule an SCFR event corresponding to the VFR event, e.g., by adding a controlled or fixed delay to the issue time for the VFR event.

Next, block 84 optionally adjusts one or more delays (e.g., D used in equation (1) above) based upon observed network jitter. The adjustment may be based upon tracking system responses and network-associated delays, and may be based in some instances on heuristics, and in other instances on various machine learning techniques. It will be appreciated that increasing D further delays an input event playback schedule and consequently reduces the number of late arriving input events that are effectively discarded; however, the cost of doing so is higher end-to-end latency.

Figure 5:
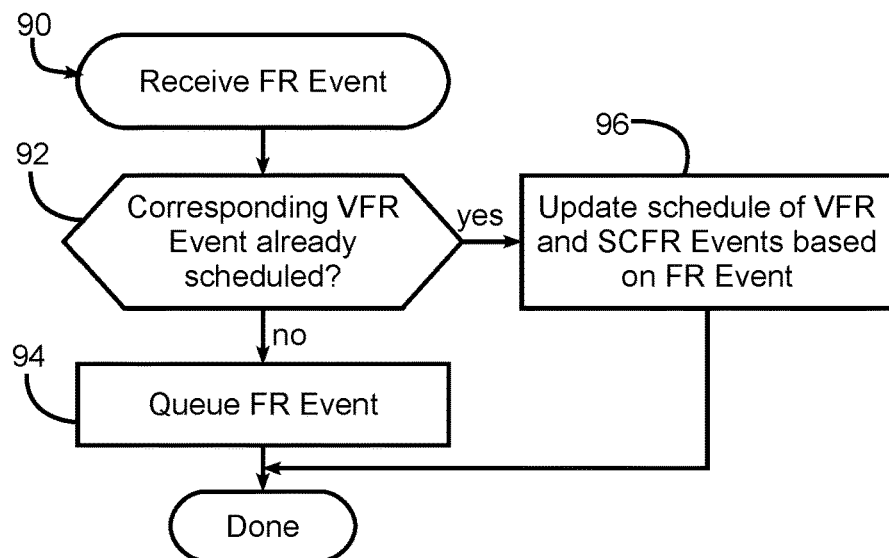
FIG. 5 is a flowchart illustrating an example sequence of operations for receiving a frame refresh event in the example environment of FIG. 1.

FIG. 5 next illustrates a sequence of operations 90 for handling received FR events in FR handler component 38. While primarily sequence of operations 90 queues received FR events for scheduling corresponding VFR events at the appropriate time, as noted above, in some instances FR events may be lost or delayed, and extrapolation and/or interpolation may be used to predict the timestamps of lost or delayed FR events. Thus, it may be desirable in some implementations to update or confirm predicted timestamps when delayed FR events finally arrive. In particular, as illustrated in block 92, it may be desirable to determine if a VFR event corresponding to a received FR event has already been scheduled. If not, control passes to block 94 to queue the FR event for later scheduling of the corresponding VFR event. If so, however, block 92 instead passes control to block 96 to update the scheduled VFR event (and, if scheduled, the corresponding SCFR event) based upon the timestamp of the received FR event.

Figure 6:
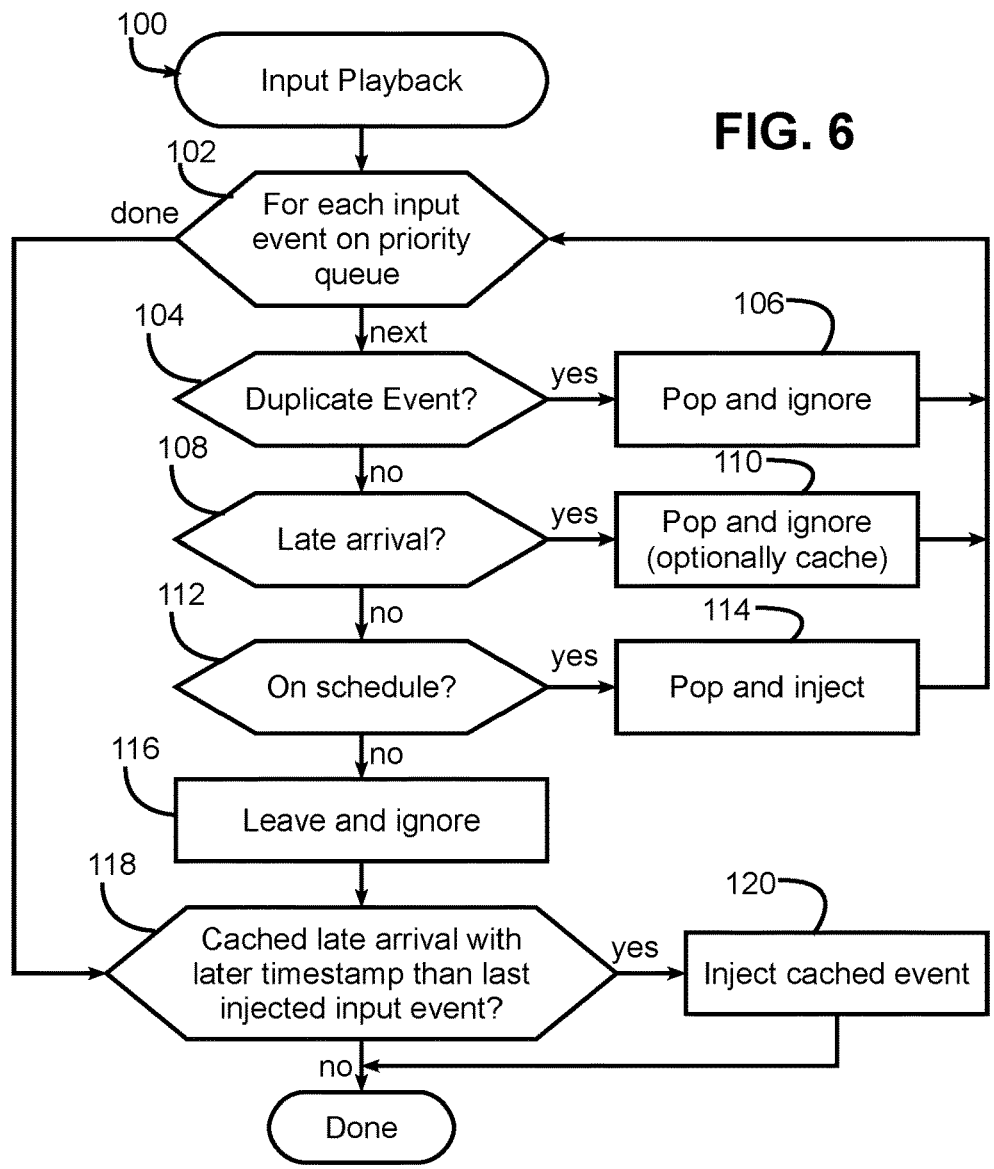
FIG. 6 is a flowchart illustrating an example sequence of operations for input playback in the example environment of FIG. 1.

Now turning to FIG. 6, this figure illustrates a sequence of operations 100 executable by input handler component 36 of control player component 32 to play back input to the virtual streaming application 12 in a synchronized fashion with the frames of the remote device. In some implementations, input handler component 36 may continuously receive input events sent from control streamer component 28 and place the received input events on a priority queue where an input event with a smaller (earlier) timestamp has a higher priority than another input event with a larger (later) timestamp. The queued input events may then be retrieved later based on a playback schedule and injected, or played back, into the virtual streaming application 12 as corresponding virtual input events. Input event injection or playback may be synchronized by calling sequence of operations 100 in response to a VFR event generated by FR handler component 38. Block 102 initiates a FOR loop to process each input event on the priority queue. Then, for each input event, that input event is handled based upon the timestamp associated with the input event relative to the timestamp associated with the VFR event triggering sequence of operations 100.

First, as illustrated in block 104, in some implementations it may be desirable to send duplicate input events to account for potential packet losses in the network, and as such, if an input event is determined to be a duplicate event in block 104, control may pass to block 106 to pop or remove the duplicate event from the priority queue, but otherwise ignore the event. The duplicate event may be detected, for example, based upon matching a timestamp of another input event that has already been injected, or based upon other identifying characteristics that indicate that the input associated with the input event has already been injected into the virtual streaming application.

If the input event is not a duplicate event, sequence of operations 100 then determines whether the input event is a late arrival event, an early arrival event, or an on schedule event. For the purposes of this discussion, denote the timestamp of a queued input event by t, that of the current VFR event by $t_1$, and that of the previous VFR event by to where $t_0 < t_1$. The queued input event may be considered to be a late arrival event, an early arrival event, or an on schedule event depending on the value its timestamp t compared to the current virtual frame interval $[t_0, t_1]$.

Block 108, for example, determines if the input event is a late arrival event, e.g., where $t \leq t_0$. The input event may be considered late, as the input event should have been injected at the VFR event with timestamp to, but arrived sometime later. Thus if the input event is a late arrival event, block 108 passes control to block 110 to pop the input event from the priority queue, and otherwise ignore the event so that it does not interfere with other on schedule events to be played back in the current virtual frame interval. However, in some implementations a late arrival event may still be useful later on, and so the last late arrival event discarded in the current virtual frame interval may also be cached future use, as will be discussed in greater detail below.

Block 112 determines if the input event is an on schedule event, e.g., where $t_0 < t \leq t_1$. The input event in this instance should be popped from the priority queue and injected, and as such, block 112 passes control to block 114 to pop the input event from the priority queue and inject the input event into the virtual streaming application. For each of duplicate, late arrival and on schedule events, control then returns to block 102 to process the next highest priority input event on the priority queue.

Returning to block 112, if the input event is not an on schedule event, the input event is an early arrival event, e.g., where $t > t_1$. The input event in such an instance should be played back in a future virtual frame interval. As such, block 112 may handle such an input event by passing control to block 116 to leave the input event on the priority queue and ignore it. In addition, because input events are processed in order on the priority queue, there is also no need to further process other input events in the priority queue in this virtual frame interval as they are all early arrival events from the perspective of the current virtual frame interval.

In some implementations, whenever all input events have been processed by the FOR loop initiated in block 102, or whenever an early arrival event is processed, playback of input events for the current virtual frame interval is complete. In other implementations, and as will be discussed in greater detail below, control streamer 28 in remote device 14 may be configured to resend a trailing event, so in such implementations, blocks 102 and 116 may instead pass control to block 118 to determine whether a cached late arrival event has a later timestamp than a last injected input event, and if so, to block 120 to inject the cached event. A further discussion of this functionality is discussed in greater detail below in connection with event filling.

Recovery of Lost or Delayed Input Events

As noted above, in some instances, particularly with mobile devices wirelessly coupled to a streaming application environment over a packet-switching network such as the internet, packet delays and losses can have an adverse impact on application streaming performance, particularly from the perspective of injecting input events into a virtual streaming application. Packet loss can be addressed in some instances using a protocol such as Transmission Control Protocol (TCP) that automatically handles packet retransmission, congestion control and reordering, although the use of TCP packets can, particularly with lossy networks, result in unacceptably long delays. Using a faster, but less reliable protocol such as User Datagram Protocol (UDP) can avoid some of the delays associated with TCP retransmissions and congestion control; however, the lost and out-of-order packets can result in inconsistent application control.

In various implementations disclosed herein, on the other hand, a number of techniques may be individually or collectively utilized to address packet losses and delays. In some implementations, for example, resiliency against packet loss may be increased by sending input events multiples times to add redundancy to the input stream, potentially with a short delay between repeats to address bursty packet loss. In addition, in some embodiments, correction events may be synthesized within the streaming application environment to account for lost and/or delayed packets.

Figure 7:
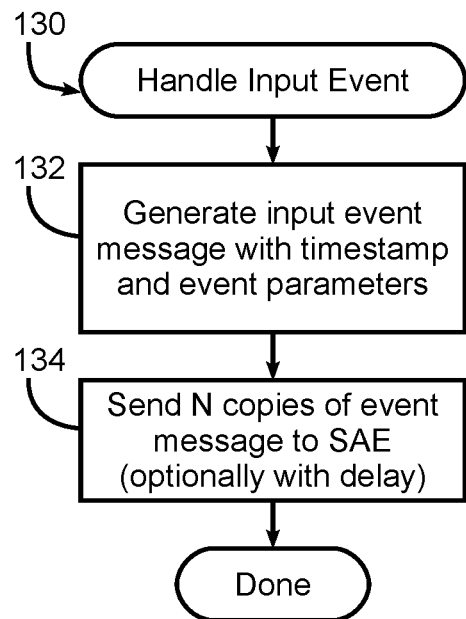
FIG. 7 is a flowchart illustrating another example sequence of operations for handling an input event to that illustrated in FIG. 2.

For example, in some implementations, control streamer component 28 of remote device 14 may be augmented to resend each input packet N times, where N may be determined based on a tradeoff between packet loss resiliency and bandwidth consumption. In addition, in some instances, to better handle bursty packet losses where consecutive packets sent in a short burst tend to get lost together, the repeated input events may be sent with a delay, e.g., about 10 ms, after a previous transmission. FIG. 7, for example, illustrates a sequence of operations 130 for handling input events in control streamer component 28, e.g., as an alternative to sequence of operations 50 of FIG. 2. In block 132, an input event message is generated, including a remote device system time timestamp, as well as any related event parameters, e.g., touch coordinates, identifiers of related input events (e.g., for touch move or touch up events associated with a particular gesture, the timestamp of the initial touch down event that started the gesture), etc. Block 134 then sends the generated event message to the streaming application environment 10 N times, and optionally including a delay between each transmission. Sequence of operations 130 is then complete.

It will be appreciated that even with event duplication, an input event can still get lost together with the duplicated input events. In many instances, the effect of the lost event may be transient and may be overwritten quickly by subsequent input events. However, for certain events, referred to herein as trailing events, this may not necessarily be the case. As such, in some implementations it may be desirable to additionally augment control streamer component 38 to incorporate event filling. A trailing event, for the purposes of this disclosure, may be considered to be the last input event in a sequence before a silent period of no further input events. A common example of a trailing event is a touch up event in a swipe gesture on a touchscreen. If the touch up event is lost together with all of its duplicate events, the streaming application environment will not be able to determine if the user has lifted his/her finger or if the finger still stays on the screen just without further movements. This unknown state is therefore no longer transient, and can persist until the user starts the next touch gesture after a long pause.

Figure 8:
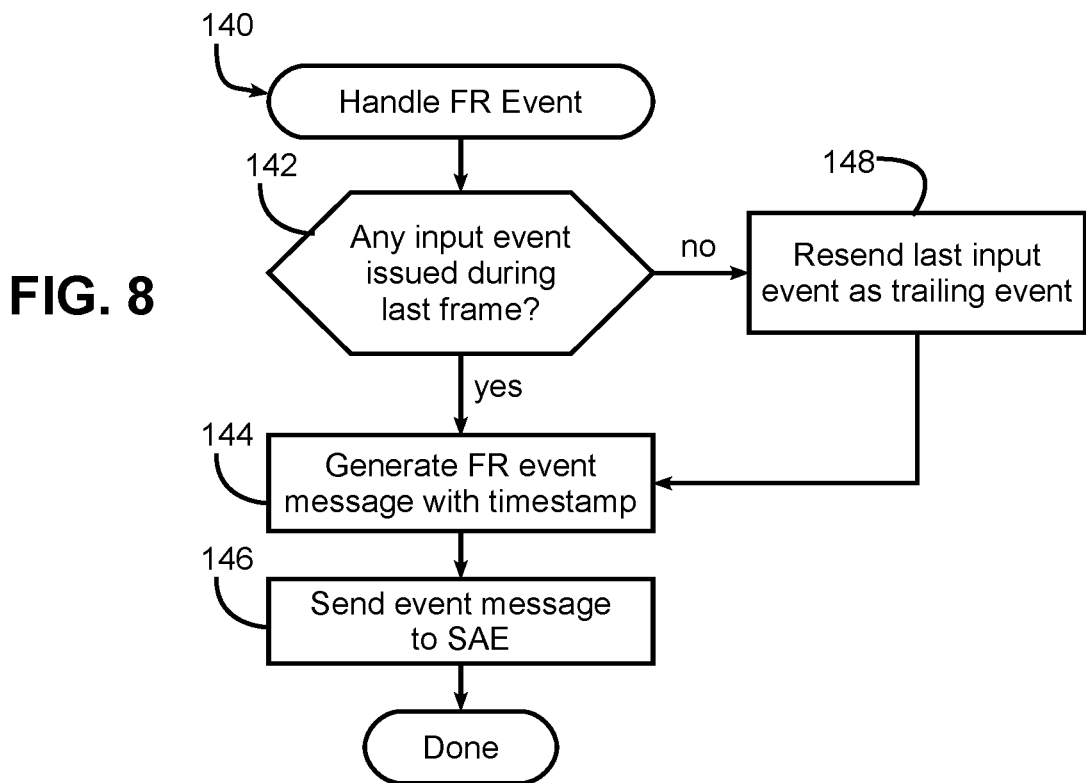
FIG. 8 is a flowchart illustrating another example sequence of operations for handling a frame refresh event to that illustrated in FIG. 3.

As such, in some implementations it may also be desirable to check in connection with each frame on the remote device whether any new input event was received within the frame, and if not, resend the last input event to ensure that the silent period is filled with the last trailing event repeatedly at the FR rate, and that the trailing event will eventually arrive at streaming application environment to resolve the unknown state. In some implementations, for example, such functionality may be implemented in connection with the handling of frame refresh events in control streamer component 28, e.g., using as an alternative to sequence of operations 60 of FIG. 3, sequence of operations 140 of FIG. 8. In sequence of operations 140, prior to generating an FR event message, block 142 may determine whether any input event has been issued during the last frame interval. If so, control passes to block 144 to generate an FR event message, including a remote device system time timestamp, and then to block 146 to send the message to the streaming application environment 10. On the other hand, if it is determined that no input event has been issued during the last frame interval, block 142 may pass control to block 148 to resend the last input event as a trailing event, prior to passing control to block 144. As such, during frames in which no input events are generated, a trailing event is still sent, thereby ensuring that the trailing event will eventually be received by the streaming application environment.

Next from the perspective of the control player component 32, event synthesis may be used to synthesize correction events, and in some instances companion events, to address lost or delayed input events. Even synthesis may be based, for example, on inferences drawn from other events that are injected on schedule. In some implementations, for example, correction events are synthesized from an injected or played-back event if applicable, and, then for each synthesized correction event and the original played-back event, a companion event may also be synthesized if applicable.

For simplicity, the following discussion for correction events will focus on gestures such as touchscreen gestures, and in particular on single-touch gestures where a single finger is manipulated on the touchscreen. It will be appreciated that a typical gesture of such a type will begin with a gesture start event and end with a gesture stop event, and with one or more gesture move events occurring between the gesture start and stop events. In the case of touchscreen gestures, for example, a touch down event, where a user first places a finger on the touchscreen, may correspond to a gesture start event, while a touch up event, where a user lifts the finger off of the touchscreen, may correspond to a gesture stop event, and a touch move event may correspond to a gesture move event. While a single-touch gesture is described hereinafter, however, extension of the herein-disclosed techniques to other gestures, including multi-finger touch gestures, mouse, trackball or other pointing device gestures, image captured gestures, and other gestures having defined start and stop events, would be straightforward. The invention is therefore not limited to use with the particular touch events described herein.

To facilitate synthesis of events, control player component 32 may be configured to track the states of gesture-related input events, including synthesized events, that are injected into a virtual streaming application, and in particular may maintain a state of a gesture as being started or completed. In some implementations, the gesture state may also correspond to a state of a pointer, e.g., where a started gesture state corresponds to a pointer down state and a completed gesture state corresponds to a pointer up state. It may also be desirable in some implementations to retain the coordinates associated with the last injected or played back input event, as well as the timestamp of the last injected or played back gesture start (e.g., touch down) event, denoted by td. In addition, it may be desirable to include with each gesture-related event a field that represents the timestamp of the associated gesture start (e.g., touch down) event that initiated the current gesture. It will be appreciated that the coordinates may correspond to a two-dimensional location on a touchscreen or other two dimensional display, while in some implementations three-dimensional coordinates may be used as appropriate.

Figure 9:
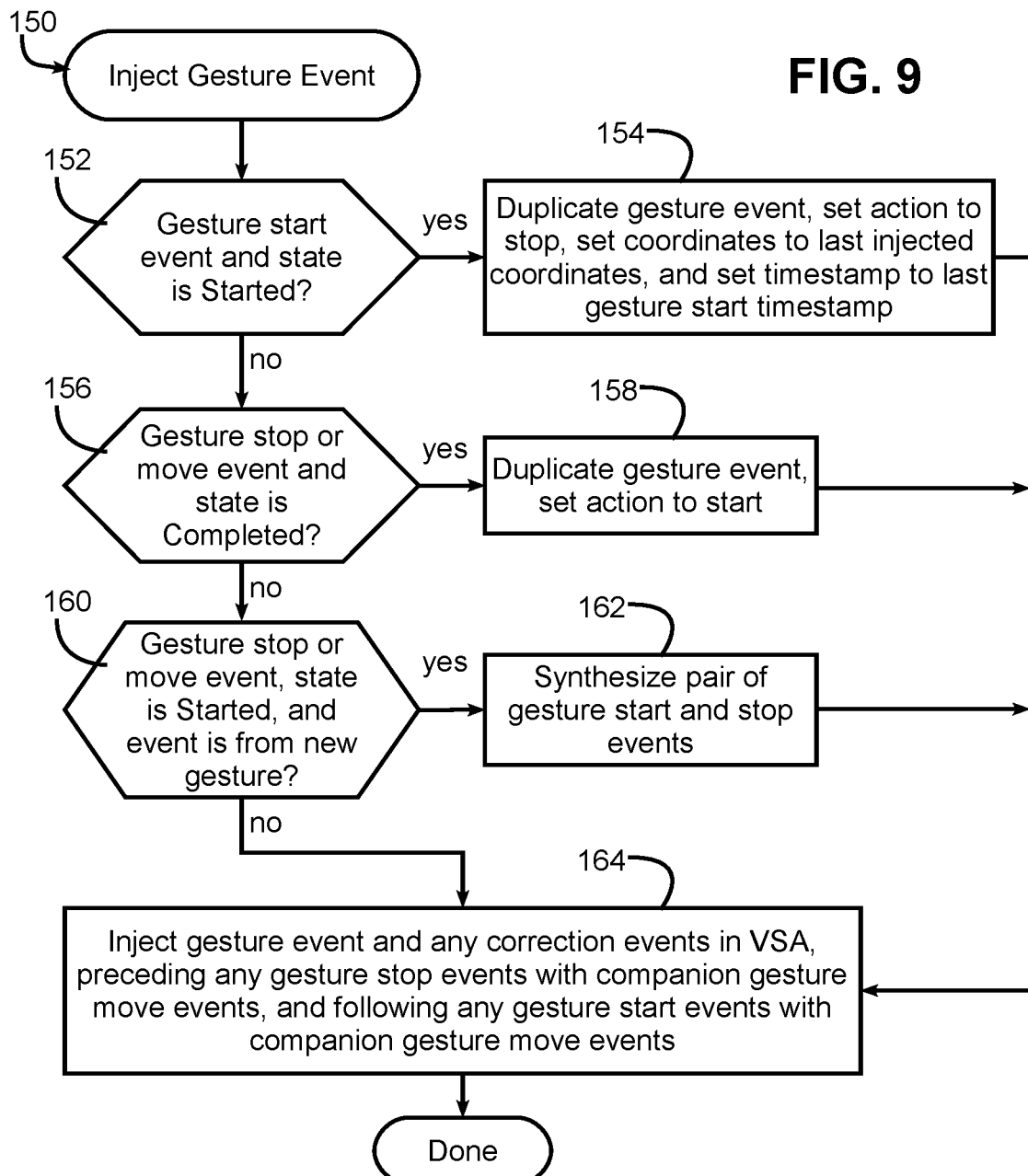
FIG. 9 is a flowchart illustrating an example sequence of operations for injecting a gesture event in the example environment of FIG. 1.

Now with reference to FIG. 9, this figure illustrates a sequence of operations 150 executable by input handler component 36 of control player component 32 to inject gesture events into a virtual streaming application. Sequence of operations 150, for example, may correspond to the injection operations referred to in blocks 116 and 120 of FIG. 6. In blocks 152-162 of sequence of operations 150, several different scenarios, which may be implemented individually or collectively in different implementations, are illustrated for synthesizing events.

Block 152, for example, tests whether the event to be injected is a gesture start (e.g., touch down) event and the gesture state is started, which effectively corresponds to the loss of a prior gesture stop (e.g., touch up) event. If so, control passes to block 154 to generate an appropriate correction event corresponding to the lost gesture stop event. For example, in some implementations the correction event may be generated by duplicating the gesture event but changing the action from start(down) to stop(up), replacing the coordinates of the event with those of the last injected input event, and replacing the timestamp with td, the timestamp of the last injected gesture start event.

Block 156 tests whether the event to be injected is a gesture stop or move event, but the current state is still completed (up), which effectively corresponds to the loss of a prior gesture start (e.g., touch down) event. If so, control passes to block 158 to generate an appropriate correction event corresponding to the lost gesture start event. For example, in some implementations the correction event may be generated by duplicating the gesture stop or move event, but replacing the stop or move action with start.

Block 160 tests whether the event to be injected is a gesture stop or move event, the current state is started (down), but in the event to be injected the timestamp of the associated gesture start (e.g., touch down) event is different from td, which effectively corresponds to the event to be injected being from a new gesture and at least one prior pair of gesture stop (e.g., touch up) and gesture start (e.g., touch down) event has been lost. If so, control passes to block 162 to generate an appropriate pair of correction events corresponding to the lost gesture stop and gesture start events, with the synthesis of the correction gesture stop and gesture start events performed in a similar manner to that described above in connection with blocks 154 and 158.

After correction events are synthesized, or if no such correction events are needed, control next passes to block 164 to inject the gesture event. In addition, in some implementations it may also be desirable to inject one or more companion events at this time. In particular, it has been observed that on a physical computing device with the touchscreen, each touch down event is always immediately followed by a touch move event, and each touch up event is always immediately preceded by a touch move event. Therefore, in some implementations it may be desirable to synthesize this behavior in block 164 by always preceding any gesture stop event (including a correction gesture stop event) with a companion gesture move event and following any gesture start event (including a correction gesture start event) with a companion gesture move event. A companion event may be generated, for example, by duplicating the associated gesture start or stop event and simply changing the action from start or stop to move.

Now returning once again to FIG. 6, as noted above, it may be desirable in some instances to cache the last late arrival input event discarded in the current virtual frame interval (block 110). After popping all the late arrival and on schedule input events in the priority queue and preserving all the early arrival input events (blocks 102-116), the cached last late arrival input event may be compared against the last injected input event in the current virtual frame interval. The cached event, although being a late arrival event, may in some implementations still be useful because it may be a trailing event that is resent periodically as described above in connection with FIG. 8. For this reason, the cached event may be played back as the last event in the current virtual frame interval as long as its timestamp is greater than the timestamp of the last input event injected or played back into the virtual streaming application. Testing of this condition is illustrated in block 118, and injecting of the cached event is illustrated in block 120. It will be appreciated that the comparison of the timestamps preserves ordering in the input events perceived by the virtual streaming application.

Example Hardware Environment

Figure 10:
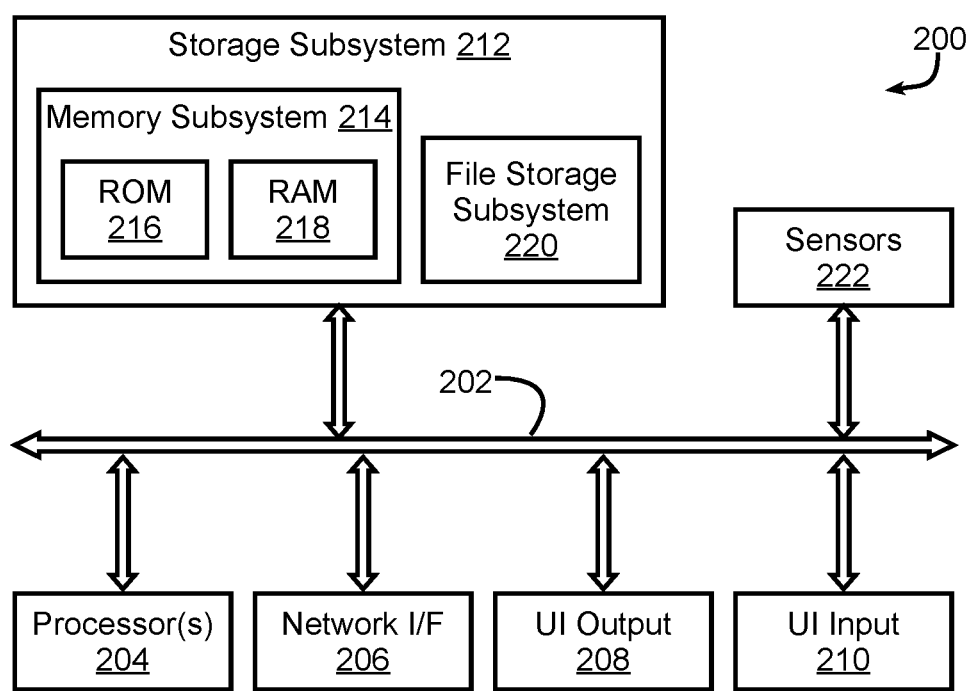
FIG. 10 illustrates an example architecture of a computer suitable for implementing one or more devices in the example environment of FIG. 1.

The herein-described techniques may be implemented in a number of different computers, computer systems, or computing devices in various implementations. FIG. 10, for example, is a block diagram of an example computer 200 that may be used to implement a remote device and/or various computer systems within an application streaming environment. Computer 200 typically includes at least one processor 204 which communicates with a number of peripheral devices via a bus subsystem 202. These peripheral devices may include a storage subsystem 212, including, for example, a memory subsystem 214 and a file storage subsystem 220, user interface output devices 208, user interface input devices 210, and a network interface subsystem 206. The input and output devices allow user interaction with computer 200, and network interface subsystem 206 provides an interface to outside networks and is coupled to corresponding interface devices in other computers.

User interface input devices 210 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer 200 or onto a communication network.

User interface output devices 208 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 212 stores programming and data constructs that provide the functionality of some or all of the modules described herein. For example, the storage subsystem 212 may include the logic to perform selected aspects of the aforementioned sequences of operations and/or to implement one or more components of the various devices and environments illustrated in FIG. 1.

These software modules are generally executed by processor 204 alone or in combination with other processors. Memory 214 used in the storage subsystem can include a number of memories including a main random access memory (RAM) 218 for storage of instructions and data during program execution and a read only memory (ROM) 216 in which fixed instructions are stored. A file storage subsystem 220 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 220 in the storage subsystem 212, or in other machines accessible by the processor(s) 204.

Bus subsystem 202 provides a mechanism for allowing the various components and subsystems of computer 200 to communicate with each other as intended. Although bus subsystem 202 is shown schematically as a single bus, alternative implementations of the bus subsystem may use multiple busses.

Computer 200 can be of varying types including a workstation, server, computing cluster, blade server, server farm, or any other data processing system or computing device. Due to the ever-changing nature of computers and networks, the description of computer 200 depicted in FIG. 10 is intended only as a specific example for purposes of illustrating some implementations. Many other configurations of computer 200 are possible having more or fewer components than the computer system depicted in FIG. 10.

Moreover, particularly where computer 200 is used to implement a remote device such as a mobile phone, tablet computer, vehicle computer, wearable computer, etc., additional sensors 222 may also be included. Sensors such as accelerometers, global positioning sensors, gyroscopic sensors, health sensors, among others, may be used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising, in a streaming application environment including one or more processors:
    interfacing a virtual streaming application with a remote device coupled to the streaming application environment over a packet-switched network, including receiving from the packet-switched network input generated at the remote device and streaming an output display representation generated by the virtual streaming application in response to the received input over the packet-switched network to the remote device;
    receiving frame refresh events from the remote device, each frame refresh event associated with a frame on the remote device;
    receiving input events from the remote device, each input event associated with an input generated during a frame on the remote device, and each input event including an associated timestamp;
    queuing the received input events, including queuing the associated timestamp for each of the received input events; and
    generating virtual frames for the virtual streaming application corresponding to the frames with which the received frame refresh events are associated, wherein each of the virtual frames comprise rendered content output by the virtual streaming application and wherein generating the virtual frames for the virtual streaming application comprises:
        generating a first virtual frame refresh event in response to a first frame refresh event received from the remote device,
        in response to generating the first virtual frame refresh event, synchronizing injection of the queued received input events for each of the queued input events, and
        handling each of the queued input events based upon the associated timestamp for each of the received input events relative to a first timestamp associated with the first virtual frame refresh event.

2. The method of claim 1, wherein the packet-switched network includes the Internet, and wherein the remote device comprises a mobile phone, a tablet computer, a wearable computer, or a vehicle computer.

3. The method of claim 1, wherein the frame refresh events from the remote device are generated based upon a frame refresh rate of the remote device, and wherein generating the virtual frames further includes controlling a virtual frame refresh rate to track the frame refresh rate of the remote device.

4. The method of claim 1, wherein generating the first virtual frame refresh event includes controlling a delay between issuing the first virtual frame refresh event to the virtual streaming application and receipt of the first frame refresh event from the remote device.

5. The method of claim 4, wherein controlling the delay includes scheduling issuance of the first virtual frame refresh event according to:

$$V(t)=A(t')+(t-t')+D$$

wherein t is a timestamp included with the first frame refresh event received from the remote device, t' is a relative minimum one-way network delay, V(t) is an issue time in the streaming application environment at which to issue the first virtual frame refresh event, A(t') is a receipt time in the streaming application environment at which the first frame refresh event is received from the remote device, and D is a maximum playback delay.

6. The method of claim 4, wherein controlling the delay includes varying the delay based upon observed network jitter in the packet-switched network.

7. The method of claim 1, wherein generating virtual frames for the virtual streaming application includes scheduling issue of a next virtual frame refresh event in response to issuing the first virtual frame refresh event and based upon extrapolation from prior frame refresh events received from the remote device such that the next virtual frame refresh event is issued despite delay or loss of a next frame refresh event from the remote device.

8. The method of claim 1, wherein generating virtual frames for the virtual streaming application includes scheduling issue of a next virtual frame refresh event in response to issuing the first virtual frame refresh event and based upon interpolation between the first frame refresh event and a later frame refresh event received from the remote device such that the next virtual frame refresh event is issued despite delay or loss of a next frame refresh event from the remote device.

9. The method of claim 1, wherein the streaming application environment further includes a video streaming component configured to stream the output display representation generated by the virtual streaming application, the method further comprising scheduling issuance of a first streaming component frame refresh event to the video streaming component with a controlled delay relative to the first virtual frame refresh event.

10. The method of claim 1, wherein injecting the given input event of the received input events into the virtual streaming application further includes:
during the first virtual frame refresh event corresponding to the first frame refresh event on the remote device:
ignoring any queued input event that is a duplicate;
injecting any queued input event that is on schedule;
discarding any queued input event that is late arriving; and
continuing to queue any queued input event that is early arriving.

11. The method of claim 1, wherein each input event is associated with user input directed to a touchscreen of the remote device.

12. A system comprising one or more processors and memory operably coupled with the one or more processors, wherein the memory stores instructions that, in response to execution of the instructions by the one or more processors, cause the one or more processors to:
interface a virtual streaming application resident in a streaming application environment with a remote device coupled to the streaming application environment over a packet-switched network, including receive from the packet-switched network input generated at the remote device and stream an output display representation generated by the virtual streaming application in response to the received input over the packet-switched network to the remote device;
receive frame refresh events from the remote device, each frame refresh event associated with a frame on the remote device;
receive input events from the remote device, each input event associated with an input generated during a frame on the remote device, and each input event including an associated timestamp;
generate virtual frames for the virtual streaming application corresponding to the frames with which the received frame refresh events are associated, wherein each of the virtual frames comprise rendered content output by the virtual streaming application, and wherein the instructions to generate the virtual frames for the virtual streaming application include instructions that are configured to:
generate a first virtual frame refresh event in response to a first frame refresh event received from the remote device,
in response to generating the first virtual frame refresh event, synchronize injection of the queued received input events for each of the queued input events, and
handle each of the queued input events based upon the associated timestamp for each of the received input events relative to a first timestamp associated with the first virtual frame refresh event.

13. The system of claim 12, wherein the frame refresh events from the remote device are generated based upon a frame refresh rate of the remote device, and wherein the instructions further include instructions configured to generate the virtual frames by controlling a virtual frame refresh rate to track the frame refresh rate of the remote device.

14. The system of claim 12, wherein the instructions are configured to generate virtual frames for the virtual streaming application by scheduling issue of a next virtual frame refresh event in response to issuing the first virtual frame refresh event and based upon extrapolation from prior frame refresh events received from the remote device such that the next virtual frame refresh event is issued despite delay or loss of a next frame refresh event from the remote device.

15. The system of claim 12, wherein the instructions are configured to generate virtual frames for the virtual streaming application by scheduling issue of a next virtual frame refresh event in response to issuing the first virtual frame refresh event and based upon interpolation between the first frame refresh event and a later frame refresh event received from the remote device such that the next virtual frame refresh event is issued despite delay or loss of a next frame refresh event from the remote device.

16. The system of claim 12, wherein the streaming application environment includes a video streaming component configured to stream the output display representation generated by the virtual streaming application, wherein the instructions are further configured to schedule issuance of a first streaming component frame refresh event to the video streaming component with a controlled delay relative to the first virtual frame refresh event.

17. The system of claim 12, wherein the instructions are configured to control injection of the received input events into the virtual streaming application by:
during the first virtual frame corresponding to the first frame refresh event on the remote device:
ignoring any queued input event that is a duplicate;
injecting any queued input event that is on schedule;
discarding any queued input event that is late arriving; and
continuing to queue any queued input event that is early arriving.

18. A method, comprising, in a device including one or more processors and a display:
receiving an output display representation from a streaming application environment coupled to the device over a packet-switched network, the output display representation generated by a virtual streaming application resident in the streaming application environment;
rendering a plurality of frames of the received output display representation on the display;
in response to inputs generated during rendering of the plurality of frames, issuing input events for communication over the packet-switched network to the streaming application environment, each input event associated with a frame among the plurality of frames during which the an associated input is generated, and each input event including a timestamp; and
issuing frame refresh events for each of the plurality of frames for communication over the packet-switched network to the streaming application environment to enable the streaming application environment to synchronize injection of the input events based upon the associated timestamp for each of the received input events, wherein the virtual frame comprises rendered content output by the virtual streaming application.

* * * * *